May 9, 1933. L. A. JONES ET AL 1,908,610
AUTOMATIC CONTROL FOR PHOTOGRAPHIC PRINTING EXPOSURES
Original Filed March 30, 1927 4 Sheets-Sheet 1
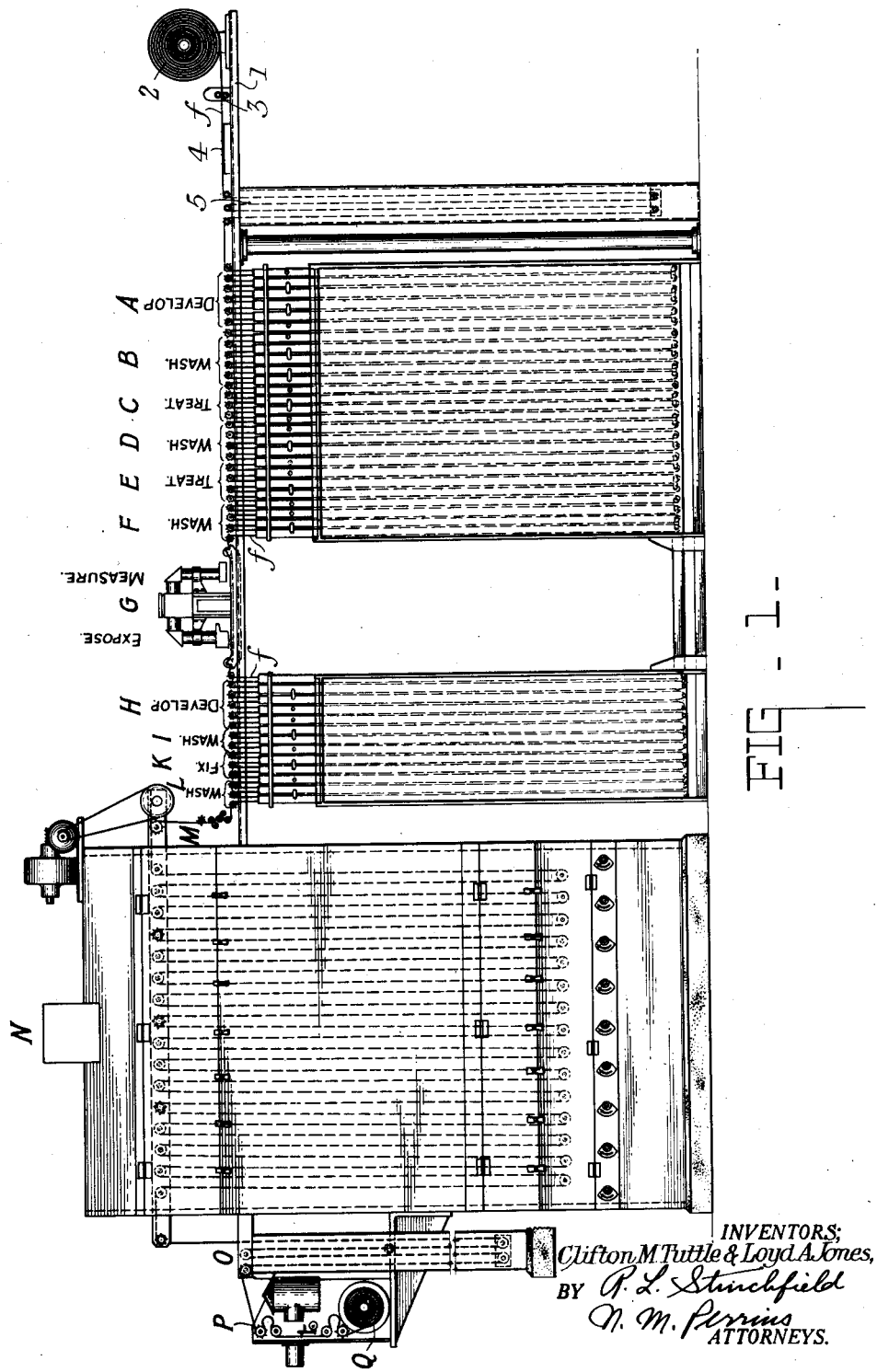

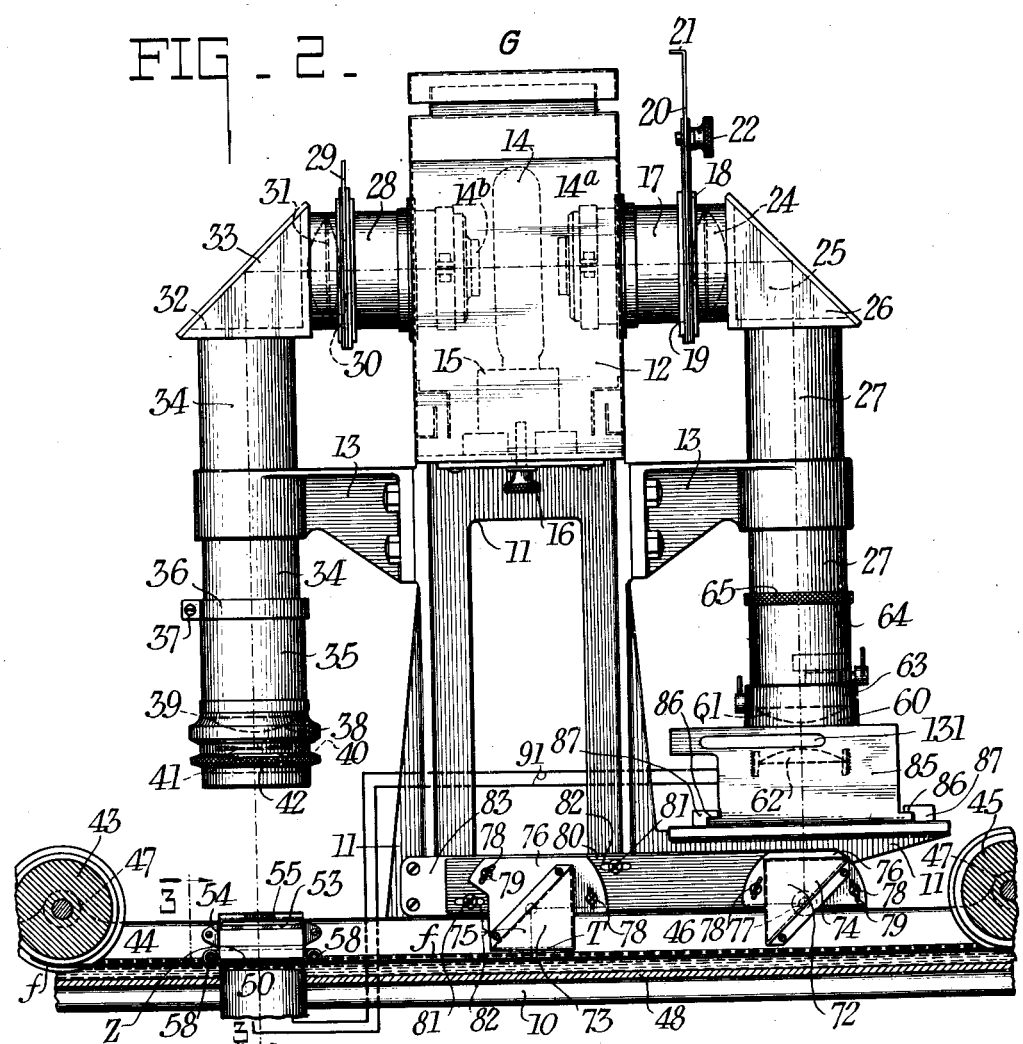

FIG_5_
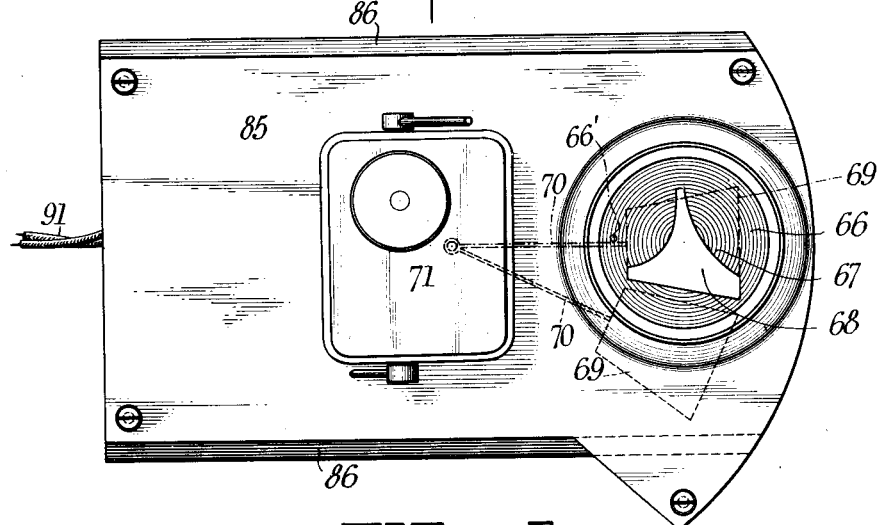
FIG_6_
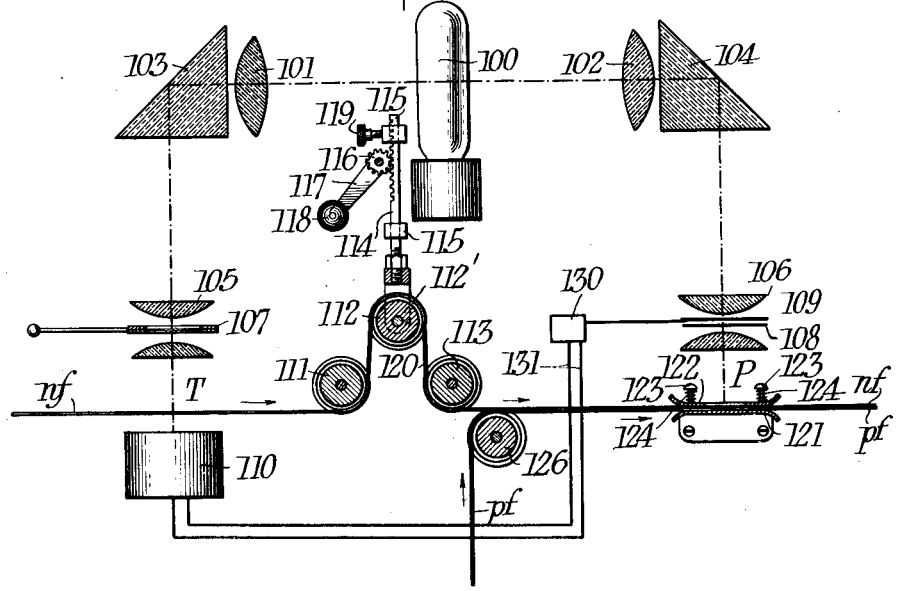
INVENTORS;
Clifton M. Tuttle & Loyd A. Jones,
BY
ATTORNEYS.

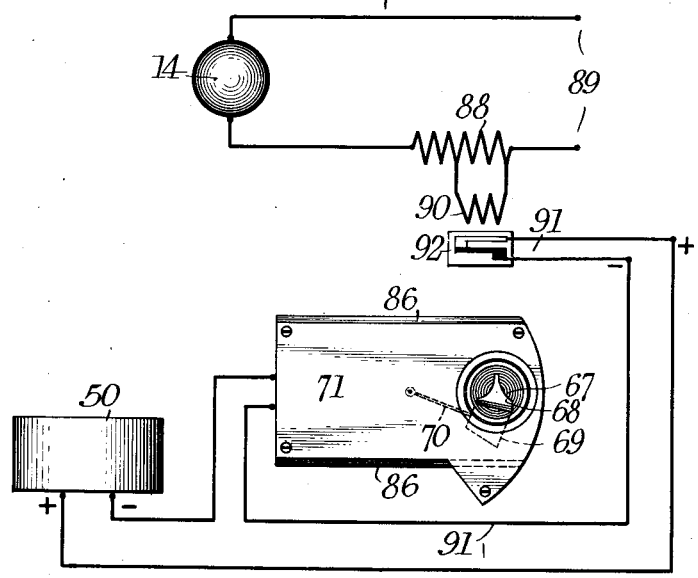
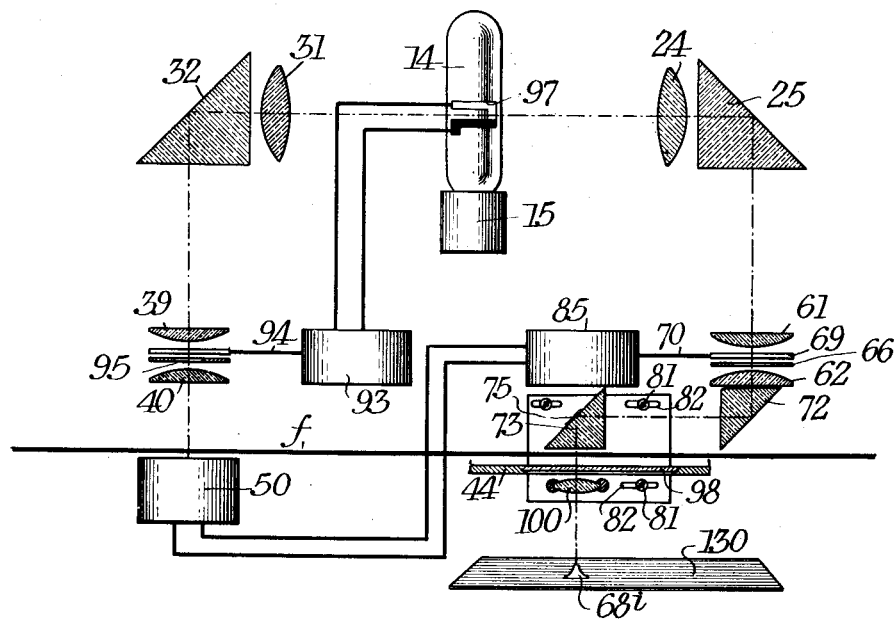

Patented May 9, 1933

1,908,610

UNITED STATES PATENT OFFICE

LOYD A. JONES AND CLIFTON M. TUTTLE, OF ROCHESTER, NEW YORK, ASSIGNORS TO EASTMAN KODAK COMPANY, OF ROCHESTER, NEW YORK, A CORPORATION OF NEW YORK

AUTOMATIC CONTROL FOR PHOTOGRAPHIC PRINTING EXPOSURES

Application filed March 30, 1927, Serial No. 179,510. Renewed May 9, 1932.

This invention relates to photography, and more particularly to machines for processing motion picture film automatically. One object of our invention is to provide a machine in which the density of an image on film is measured, and an exposure is automatically controlled by the density measurement. Another object is to provide a machine for processing film in which the film is developed into a negative, bleached, re-exposed and developed into a positive, the extent of re-exposure being automatically controlled. Another object of our invention consists in providing an automatic measuring and exposing unit in which a single light source is used for the measuring and exposing operations so that the exposure is made from the same light by which the measurement for the exposure was made thus minimizing incorrect exposure due to voltage fluctuations; another object is to provide a machine for measuring the density of an image on a film for an exposure and for furnishing an exposure which is a complex function of the measured film density; another object of our invention is to provide a measuring and exposing unit adapted to measure and expose film at two stations separated by a distance which may be adjusted to compensate for the speed of travel of the film and to the lag in the unit; another object is to provide a measuring and exposing unit in which non-actinic light rays, falling upon a radiation-responsive element after passing through a film, control an exposure by means of a movable vane controlled by the radiation-responsive element and movable over a special diaphragm. Other objects will appear hereinafter from the following specification, the novel features being pointed out in the claims at the end thereof.

In a machine for processing film, particularly in a machine for processing film by the reversal process, most of the work is done automatically, but the step of printing has been usually done by relying on the judgment of an operator for the required exposure. While operators become expert in judging film density and the time required for a printing exposure, nevertheless in a continuous processing machine, it is impossible to work over even relatively short periods of time without making errors in judgment due to fatigue. The film frequently passes a viewing station at a speed of the order of a half foot per second, making accurate visual estimates and measurement difficult.

The machine in connection with which the preferred embodiment of our invention is described is designed for the continuous treatment of motion picture film in accordance with the process described in the patent to Capstaff, No. 1,460,703, granted July 3, 1923. Such a machine, in which the film is measured or estimated by an operator, also controls the re-exposure light, is disclosed in the patent to Capstaff, No. 1,690,616, granted Nov. 6, 1928.

In reversal processing machines there is the added difficulty that the operator must judge the film density from a bleached image which is scarcely visible, so that a much higher degree of skill is required and errors due to fatigue occur more readily.

Our present machine includes a measuring and exposing unit by which the human element is entirely eliminated in so far as providing the exposure necessary for the different film sections goes, and in addition to obtaining the proper exposure, the light changes are always made at the proper place as the scenes change or as changes in density occur.

Coming now to the drawings wherein like reference characters denote like parts throughout:

Fig. 1 is a typical side elevation of a machine for treating film for the reversal process, in which our automatic measuring and exposing unit has been incorporated, constructed in accordance with and illustrating a preferred embodiment of our invention;

Fig. 2 is a front elevation, partially in section, of the measuring and exposing unit;

Fig. 3 is a part section, part elevation on line 3—3 Fig. 2;

Fig. 4 is a front elevation of a light controlling diaphragm removed from the unit;

Fig. 5 is a top plan view of the printing light controlling device removed from the unit; and Fig. 6 is a diagrammatic view showing another embodiment of our invention.

Figs. 7 and 8 are diagrams illustrative of methods of compensating for voltage fluctuations.

Since our invention is particularly useful as a part of a photographic reversal processing machine, we will describe such a machine.

In Fig. 1 a typical machine is shown. This is, up to the drying cabinet at least, mounted in a dark room. It may consist of a support 1 upon which reels 2 of exposed film may be placed and from which the film f may be drawn through guides 3 across a splicing block 4 into a take-up chamber 5. From this chamber the film is fed at a uniform speed through the fluid treatment tanks, A, B, C, D, E and F wherein the film is successively developed, washed, treated or bleached, washed, treated and washed.

The film, after the last treatment and washing contains a bleached, slightly visible image, which is exposed to a controlled light, as fully described in said U. S. Patent 1,460,703 and developed into the final positive. For this purpose we have included our automatic film measuring and exposing unit designated broadly at G.

After being measured and exposed, the film f passes into the fluid treatment tanks H, I, K, and L, where it is successively developed, washed, fixed and finally washed, after which it may pass through a suction dryer M and then into the drying cabinet N, where warmed air may be circulated by any desired system (not shown).

The dry film is now led into a take-up chamber O, and is preferably run through a projector P so that the quality of the completed film may be judged, and is finally wound upon a take-up reel at Q, being preferably here divided into rolls of convenient length or into separate orders as the case may be.

With the machine above described, all an operator needs to do is to splice on new film at the supply station, furnishing film rolls 2, and to watch the projection of the dried film and remove the full reels at Q. The fluid treatment, film measuring and exposing and drying of the film are entirely automatic.

Referring to Fig. 2, which is shown as it appears from the rear of Fig. 1, and wherein measuring and exposing unit H is shown on an enlarged scale, this unit preferably comprises a base 10 from which a suitable standard 11 extends upwardly supporting a lamp house 12 and a pair of side brackets 13.

Lamphouse 12 encloses a concentrated filament lamp 14 in a socket 15 which may be adjusted to focus the lamp by screw 16 and other movable elements not shown. On each side of lamp 14 is a light diffusing screen 14a and 14b, such as ground or opal glass or ground quartz, as these provide a satisfactory, ever illumination. A tube extends from each side of the lamphouse.

Tube 17 contains a light beam controlling member 18 including a slideway 19 (Fig. 4) in which a masking plate 20 may slide. The plate 20 can be set in any position by handle 21, being locked by screw 22 which passes through slot 23. The width of this mask is fixed as the width of the light beam should, when it reaches the film, be as wide as the film. The length of the beam is controlled by plate 20.

From the beam controlling member 18 the light rays pass through a lens 24 and through a prism 25 in a housing 26. A tube 27 extends from 26 through the supporting bracket 13.

The second tube 28 extends from lamphouse 12, this tube having a filter at 29 which passes only non-actinic light rays from lamp 14. We preferably provide this filter in the form of a slide which includes a rectangular mask 30 covered with suitable filter material as red glass. This mask preferably controls the light beam to the size and shape, when it reaches film f, of a single exposure area of the particular film employed.

From the filter-mask the light passes to a prism 32 through lens 31 in housing 33, the light beam passing into the tubular member 34 extending through bracket 13. A second tube 35 may be adjusted on tube 34 by the pinch collar 36 and screw 37. Tube 35 contains an objective 38 including lens elements 39 and 40 with an iris diaphragm 41 which may be controlled by the knurled ring 42 between the elements.

In the drawings at Fig. 2, the light measuring side of unit G is the left hand side, the film f advancing under roller 43 into the tank 44 under roller 45 and thence to tank H. Tank 44 comprises side walls 46, supports 47 for rollers 43 and 45 and the bottom 48 is apertured at 49 to receive an element responsive to radiant energy, a thermopile 50 mounted therein beneath a glass window 51 (Fig. 3) which has a water tight connection with bottom 48.

The film is guided by rollers 43 and 45 just below the surface of the water 52 in the tank over the window 51. To break the surface of the water and to prevent light refraction from the surface thereof, there is a glass block 53 mounted in a support 54 hinged at 55 to wall 46 and having a foot 56 positioning it in the tank. The support 54 has roller supporting brackets 57 affixed thereto, and undercut rollers 58 guide and locate the film f beneath the glass block 53.

The optical system for measuring the film opacity is as follows: Lens 31 forms an image of the evenly illuminated opal glass 14b in objective 38 after being bent by prism 32.

Objective 38 images the evenly illuminated lens 30 on the film $f$ after passing through the glass block 53 and the light rays passing through film $f$ and window 51 pass to the thermopile 50. The beam is therefore uniform at the diaphragm and at the film.

Objective 60, like 38, comprises two lens elements 61 and 62 separated in a housing 63, there being a tubular member 64 telescoping the end of tubular member 27 and having a knurling 65 by which it may be moved to observe the special diaphragm belt shown in Fig. 5.

Between the elements of objective 60 there is mounted a special diaphragm 66 consisting of an opaque plate 67 having a cut-out opening 68 of special shape which may be nearly, but not quite entirely, covered by a movable vane 69 on an arm 70 controlled by a galvanometer or similar instrument such as a standard commercial type of millivoltmeter 71 connected by wires 91 in a circuit with the thermopile. The light beam is projected by objective 60 through prisms 72 and 73 mounted on housings 74 and 75 to the film $f$.

Lens 24 focuses the evenly illuminated opal glass 14a in the objective 60 and the objective 60 focusses the evenly illuminated lens 24, as defined by mask 20 upon the film. The beam is, therefore, uniform at the diaphragm and at the film.

It is well known that, in general, the density of a developed image is not directly proportional to the intensity of the exposure, but is a complex function, approximately a logarithmic function. This is true also of the image resulting from the exposure of a film as re-exposed in the reversal process referred to.

If the response of the thermopile is directly proportional to the intensity of the light falling upon it, and if, further, the movement of the vane 69 is directly proportional to the response of the thermopile, the shape of the diaphragm opening 68 should be such that the area of the opening uncovered by a uniform movement of the vane should bear the same relation to the uniform movement that the amount of light required to produce a series of developed images of uniform graded density bears to the rate of increase of the density.

If the response of the thermopile or of the vane is not a straight line function, the shape of the diaphragm would have to be altered to compensate for these constants of the machine, so that the area would increase in such a way as to produce the desired uniform increase of density in the developed image corresponding to variations in the light falling on the thermopile.

It will be noticed that the printing station T is only a short distance from the measuring station at Z, this being a distance determined by the speed at which the film travels and the time it takes for the vane to respond to variations in the measuring light beam.

Housings 74 and 75 are both adjustable, being mounted on plates 76 which may turn about axis 77 and may be adjusted by screws 78 passing through arcuate slots 79. Both plates are carried on a slide 80 adjustable by screws 81 passing through slots 82 into the supporting face 83 of the standard 11.

Where there is a material change to be made in the distance between stations T and Z a slide and suitably spaced prisms may be substituted together with an objective 60 of the necessary focal length. In practice, small adjustments may be made without altering the objective. However, the lower lens element 62 is adjustable, and when the prisms are adjusted it may also be moved to focus the beam on the plane of the film.

We also prefer to provide interchangeable thermopile units and galvanometer or millivoltmeter units; thus by removing housing 50, a new thermopile may be slipped into place. By sliding housing 85 on rails 86 which engage tracks 87 of standard 11, a new millivoltmeter may be quickly slid into place.

On the diaphragm 66 is a stop 66' against which the vane will rest in the upper position shown in Fig. 5, whereby a certain minimum area of the diaphragm opening will always be left. In setting the instrument, the iris diaphragm will be adjusted so that the vane will be moved from this initial position when film of a desired density passes over the thermopile. There will be, therefore, a certain fixed minimum of light that will be passed whenever the density of the bleached image is greater than a predetermined amount, and this amount may be controlled by the setting of diaphragm 41. As the density decreases from this amount, the vane will be moved proportionally until for a certain density the opening 68 will be entirely uncovered.

In case there should be a breakdown of the automatic measuring and exposing mechanism, an opaque mask may be slid into slide 18, the red filter withdrawn at 29 and the printing may be done with the iris diaphragm control of objective 38 by visual inspection as has been customary. This change may be made with sufficient speed so that only a short length of film would be lost.

In Fig. 6 we have shown a second embodiment of our invention where a measuring and exposing unit is used for printing a positive from a negative on a separate film. Here a lamp 100 is used with lenses 101 and 102, prisms 103 and 104 and objectives 105 and 106. A diaphragm 107 lies between the elements of objective 105 and a special diaphragm 108 and movable vane 109 (similar to 68 and 69) lie between the elements of objective 106. The vane 109 is controlled by galvanometer in case 130 connected by wires 131 with a thermopile 110 as above described.

The negative film $nf$ is led in over thermopile 110 and over guide rollers 111, 112 and 113. Roller 112 is carried by a yoke 111 guided by rack 114 in brackets 115, the rack meshing with a pinion 116 which may be turned by handle 117 through crank 118. A set screw 119 may be used to hold the parts in any desired position. By changing the film loop 120 through the mechanism above described, the amount of film between the measuring station T and the printing frame P may be regulated.

The printing frame comprises a base plate 121 mounted in a fixed position and there is a presser plate 122 mounted on bolts 123 carried by plate 121 and having springs 124 encircling the bolts so as to resiliently hold the plates together. The positive film $pf$ is led over roller 126 and passes through the printing frame with film $nf$ at the same speed. A printing window 127 is cut in plate 122 and through this window light passes to the films.

As will appear obvious from the foregoing description, the negative opacity is measured at station T and from this measurement the light at station P is controlled, the distance of film travel between these stations being controlled to suit the speed of travel of the film and the speed of response of the printing light to changes in the negative density.

In this form of the invention, the vane will be positioned so as to pass the minimum light, as indicated in dotted lines in Fig. 5, when the density of the negative is least, whereas in the reversal process, as outlined above, the minimum light is passed when the density is greatest. For this reason, variations in line voltage are much less important in the last-described form since a reduction in the intensity of lamp 100 will result in an increased opening of the diaphragm. In the reversal process, on the other hand, a reduction in the illumination from lamp 14 will result in a decrease in the opening of the diaphragm which is undesirable.

Where the source of electrical supply is liable to changes in voltage, it is, therefore, desirable to provide means for compensation. In Fig. 7 is shown the electrical diagram which may be used for such a system. The lamp 14 is in series with a resistance 88 across the supply lines 89 which are liable to changes in voltage. A second resistance 90 is in parallel with a portion of this resistance, and immediately adjacent this is a thermocouple 92 in series with and opposed to the thermopile 50, the instrument 71 controlling the vane 69 being in the same circuit, and wires 91 connecting the various instruments and completing the circuit as described. An increase in potential on the supply line will increase the current flowing through the lamp and resistances, thereby increasing both the light falling on thermopile 50 and the heat affecting the thermocouple 92. Since these are opposed they will tend to counteract each other and to minimize or overcome the effect of the voltage change.

Another method of control is indicated in Fig. 8, wherein the elements, except as otherwise indicated, are the same as in the form first described. In this figure only certain parts and the electrical connections are shown diagrammatically. In place of the diaphragm 41, there is used a galvanometer 93 operating a vane 94 over a diaphragm with opening 95. The galvanometer 93 is connected to a thermopile 97 situated near lamp 14 so as to be directly exposed to the rays therefrom.

These parts and their operation are similar to the parts already described in connection with diaphragm 66. The shape of the diaphragm opening 95, like opening 68, is designed with special reference to its purpose. In this case, it is so designed that, as the voltage on the line varies, causing variation in the intensity of light emitted by the lamp 14, the total light permitted to pass the opening 68 and vane 94 is such that, if the film is of uniform density, the light passing through the second diaphragm 66 will also be constant. That is, account is taken, not only of the variations of light from lamp 14 due to changes in voltage, but also compensation is made to assure that diaphragm 66 will be open wider as the lamp 14 decreases in brilliancy. Other constants of the instrument are also taken into account, such as departures of the thermopile 93 and galvanometer 97 from straight line action. It is obvious that the relation is a very complex one, and in practice must be worked out largely by experiment with the particular instruments.

Another useful detail is also shown in Fig. 8. The trough 44 has a glass bottom portion 97 beneath the printing station. The adjustable housing 75 carrying the reflecting prism 73 is carried by a frame 99 carrying a lens 100, adapted to image at 68$i$ the diaphragm opening 68 on a fixed screen 130. The operator can then tell at a glance at any time just what area of opening is in use. This facilitates the original setting or adjustment of the instrument. A slot 131 (Fig. 2) is also provided in the casing 85, through which the vane may be directly inspected.

It is to be understood that when in the claims the word "light" is used, it is meant to include radiations of any wave length, visible or invisible, having the properties necessary for the operation of the disclosed process and apparatus.

It is to be understood that the described structures are examples and that we consider as included in our invention all such modifications and equivalents as fall within the scope of the appended claims.

Having thus described our invention, what we claim as new and desired to secure by Letters Patent is:

1. In a machine for use in a photographic reversal process and having two stations, an element responsive to radiant energy at the first station, an exposure window at the second station, means for directing a single film band containing an image of light sensitive salts over said element and past said window, an optical system for throwing through said film and upon the element at the first window a beam of light of wave lengths to which the film is insensitive, an optical system for throwing a beam of light upon the film at the second window, said last named system including an apertured diaphragm fixed in position and separated from said window and a movable vane cooperating therewith and controlled by said element and effective to vary the amount of light in the last named beam, the diaphragm and vane cooperating to vary the amount of light in the last named beam at a rate which is a logarithmic function of the variation of light falling upon said light sensitive element.

2. In a machine for use in a photographic reversal process and having two stations, an element responsive to radiant energy at the first station, an exposure window at the second station, means for directing a single film band containing an image of light sensitive salts over said element and past said window, an optical system for throwing through said film and upon the element at the first window a beam of light of wave lengths to which the film is insensitive, an optical system for throwing a beam of light upon the film at the second window, means controlled by said element for varying the amount of light in the last named beam at a higher rate than the variation of light falling upon the element and means for varying the length of the path of the film between the stations.

3. In a machine for use in a photographic process, an element responsive to light, means for directing an image bearing film over said element, an optical system for directing light through said film upon the element, an exposure window, means for guiding past said exposure window a sensitive film capable, upon exposure to light, of having developed thereon an image, the amount of light exposure being a complex function of the density of the resultant image, an optical system for directing light upon said window, said last named system including a variable light interceptor controlled by said element and so constructed that the amount of light directed upon said window is the same said complex function of the light falling on said element.

4. In a machine for use in a photographic reversal process and having two stations, an element responsive to radiant energy at the first station, an exposure window at the second station, means for propelling a single film band containing an image of light sensitive salts over said element and past said window, means for throwing non-actinic light through said film at the first station and upon the element, means for throwing a beam of actinic light upon the window, a fixed diaphragm with an opening in said beam, a vane movable across said opening and controlled by said element whereby the light permitted to fall upon the window will be caused to vary by variations in light falling on the element through the film.

5. In a machine for use in a photographic reversal process and having two stations, an element responsive to radiant energy at the first station, an exposure window at the second station, means for propelling a single film band containing an image of light sensitive salts over said element and past said window, means for throwing non-actinic light through said film at the first station and upon the element, means for throwing a beam of actinic light upon the window, a fixed diaphragm with an opening in said beam, a vane movable across said opening and controlled by said element whereby the light permitted to fall upon the window will be caused to vary by variations in light falling on the element through the film, the opening increasing progressively in height from side to side, whereby the effective area thereof will increase at a much more rapid rate than the extent of movement of the vane.

6. In a machine for use in a photographic reversal process and having two stations, an element responsive to radiant energy at the first station, an exposure window at the second station, means for directing a single film band containing an image of light sensitive salts over said element and past said window, an optical system for throwing through said film and upon the element at the first window a beam of light of wave lengths to which the film is insensitive, an optical system for throwing a beam of light upon the film at the second window, means controlled by said element for varying the amount of light in the last named beam, at a higher rate than the variation of light falling upon the element, and means for adjusting the amount of light directed by the first optical system upon the film and element.

7. In a machine for use in a photographic process, an element responsive to light, means for directing an image bearing film over said element, an optical system for directing light through said film upon the element, an exposure window, means for guiding past said exposure window a sensitive film capable upon exposure to light of having developed thereon an image, the amount of light exposure being a complex function of the density of the image, an optical system for directing light upon said window and a light interceptor controlled by said element for varying the amount of light directed upon the window, said interceptor being so constructed that the said variation in light is the same, said complex function of the variation in light falling on said element and means for adjusting the amount of light directed by the first optical system upon the film and element.

8. In a machine for use in a photographic reversal process and having two stations, an element responsive to radiant energy at the first station, an exposure window at the second station, means for directing a single film band containing an image of light sensitive salts over said element and past said window, an optical system for throwing through said film and upon the element at the first window a beam of light of wave lengths to which the film is insensitive, an optical system for throwing a beam of light upon the film at the second window, means controlled by said element for varying the amount of light in the last named beam at a higher rate than the variation of light falling upon the element, means for varying the length of the path of the film between the stations, and means for adjusting the amount of light directed by the optical system upon the film and element.

9. In a machine for use in a photographic process and having two stations, an element responsive to radiant energy at the first station, means for directing a beam of light upon said element, an exposure gate at the second station, means for directing light upon said window, means for adjustably controlling the amount of light so directed, an electric instrument responsive to current variations for operating said means, an electric circuit including said instrument and said element, means for moving and guiding a single strip of film carrying an image of sensitized salts through said beams of light in succession, the speed of the film movement and the constants of the instruments being so related that a variation in light falling on the element through a definite point in the film at the first station will result in an adjustment in the light controlling means when the definite point shall have reached the second station, and means for adjusting the distance between the two stations to compensate for changes in the speed of film movement and in the constants of the instrument.

10. In a machine for use in a photographic process and having two stations, an element responsive to radiant energy at the first station, means for directing a beam of light upon said element, an exposure gate at the second station, means for directing light upon said window, means for adjustably controlling the amount of light so directed, an electric instrument responsive to current variations for operating said means, an electric circuit including said instrument and said element, means for moving and guiding a single strip of film carrying an image of sensitized salts through said beams of light in succession, the speed of the film movement and the constants of the instruments being so related that a variation in light falling on the element through a definite point in the film at the first station will result in an adjustment in the light controlling means when the definite point shall have reached the second station, means for adjusting the amount of light in the beam at the first station and means for varying the length of the path of the film between the stations.

11. In a continuous photographic processing machine of the type having two series of tanks, film inspection and exposure stations between said tanks and means for continuously driving a single long sensitized film strip through one series of tanks wherein it may be developed and bleached, then past the inspection and exposure stations and then through the second series of tanks wherein it may be redeveloped, the machine including open film guideways at the inspection and exposure stations, an improved exposure control apparatus at the insection and exposure stations comprising an optical system for illuminating the film from one side at the open inspection guideway, means for filtering from the illuminating system actinic rays to which the film in the guideway is sensitive, a radiation-sensitive element on the other side and positioned to receive rays passing through the film, an optical system for illuminating the film at the open exposure guideway and including a diaphragm with an opening, a vane movable across the opening, an electrical instrument adapted to control the movement of the vane, and an electrical circuit including the said radiation-responsive element and the said instrument, whereby variations in the intensity of the light falling upon the element after passage through the film will cause movement of said vane across the diaphragm.

12. In a continuous photographic processing machine of the type having two series of tanks, film inspection and exposure stations between said tanks and means for continuously driving a single long sensitized film strip through one series of tanks wherein it may be developed and bleached, then past the inspection and exposure stations and then through the second series of tanks wherein it may be redeveloped, the machine including open film guideways at the inspection and exposure stations, an improved exposure control apparatus at the inspection and exposure stations comprising an optical system for illuminating the film from one side at the open inspection guideway, means for filtering from the illuminating system actinic rays to which the film in the guideway is sensitive, a radiation-sensitive element on the other side and positioned to receive rays passing through the film, an optical system for illuminating the film at the open exposure guideway and including a diaphragm with an opening, a vane movable across the opening, an electrical instrument adapted to control the movement of the vane, and an electrical circuit including the said radiation-responsive element and the said instrument, whereby variations in the intensity of the light falling upon the element after passage through the film will cause movement of said vane across the diaphragm, the opening changing progressively in height from side to side whereby the effective area thereof will vary at a much more rapid rate than the extent of movement of the vane.

13. In an optical instrument, an optical system for directing a beam of light upon an object having the characteristic that it is capable of being affected by light, the amount of light falling upon the object being a complex function of the effect produced thereby, a diaphragm having an opening transversely of the beam, a vane opaque to actinic light movable across the opening to uncover a variable area thereof, the height of the opening varying progressively from side to side to an extent such that the area of the opening measured from one side thereof to successive points transversely thereof will vary in accordance with said complex function.

14. In a machine having a printing window for use in a photographic printing process, wherein film at such printing window is exposed to light and thereafter developed, the density of the resulting image being a complex function of the exposure light, an optical system for directing a beam of light upon said window, a diaphragm having an opening transversely of the beam, an opaque vane movable transversely across said opening and thereby adapted to leave a variable amount of said opening uncovered, the height of the opening varying progressively from side to side, such that the area left uncovered as the vane moves from one side to the other will bear such a relation to the complex function that uniform movements of the vane will cause uniform increments in density in the resulting image.

15. In a machine for use in a photographic process, a trough adapted to contain water at a predetermined level, means for drawing a band of film continuously through the trough, and an optical instrument including elements for directing a beam of light into the trough and upon a film in said trough, and a glass plate positioned in the trough in the path of the beam and at the water level.

16. An optical instrument including a source of light, an element responsive to light, means for directing an image bearing film over said element, an optical system for directing light from said source through said film upon said element, an exposure window, means for directing a beam of light from said source upon said window, means controlled by said element for varying the amount of light in the last named beam and means automatically operative with variations in the brightness of the source of light compensating for such variations and tending to maintain the effective light at the exposure window constant.

17. An optical instrument including a source of electric power, an electric lamp connected with said source, an element responsive to light, means for directing an image bearing film over said element, an optical system for directing light from said lamp through said film upon said element, an exposure window, means for directing a beam of light from said lamp upon said window, means controlled by said element for varying the amount of light in the last named beam, and means automatically operative with variations in the brightness of the lamp for adjusting the amount of light directed by the optical system upon the film and element to compensate for such variations.

18. In a machine for use in a photographic process, an element responsive to light, an exposure station including a window, means for directing a film past said element and said window, optical means for projecting light upon said window and through said film upon said element, a diaphragm fixed in position and separated from said window and with an opening in the path of light to the window, a vane movable across said opening and controlled by said element whereby the light permitted to fall upon the window through the opening will be caused to vary by variations in light falling on the element through the film.

19. In a machine for use in a photographic process, an element responsive to light, an exposure station, means for directing a film past said element and said station, optical means for projecting light upon said station and through said film upon said element, a fixed diaphragm with an opening in the path of light to the station, a vane movable across said opening and controlled by said element whereby the light permitted to fall upon the station through the opening will be caused to vary by variations in light falling on the element through the film, the opening increasing progressively in height from side to side, whereby the effective area thereof will vary at a more rapid rate than the rate of movement of the vane.

20. In a machine for use in a photographic process, an element responsive to light, means for directing an image bearing film over said element, an optical system for directing light through said film upon said element, an exposure window, means for directing a beam of light upon said window, an apertured diaphragm in the last named beam and a movable vane controlled by the response of said element for varying the effective aperture of the diaphragm, the apertured diaphragm being so shaped that movement of the vane varies its effective aperture in accordance with a logarithmic law.

21. In a machine for use in a photographic process, an element responsive to radiant energy, means for directing an image bearing film past said element, means for directing light through said film upon said element, a printing window, a source of light and means including said source for throwing a beam of printing light upon said printing window, a movable member connected to and controlled by the responsive element and operative to vary the amount of light in the beam, and means rendering the last named member effective at a rate increasingly greater than the increase in response of the element.

22. In a machine for use in a photographic process, an element responsive to light, means for directing an image bearing film over said element, an optical system for directing light through said film upon said element, an exposure window, means for directing a beam of light upon said window, an apertured diaphragm in the last named beam and a movable vane controlled by the response of said element for varying the effective aperture of the diaphragm, the apertured diaphragm being so constructed that its effective aperture is varied exponentially with the movement of said vane.

23. In a machine for use in a photographic process, an element responsive to light, an exposure station including a window, means for directing a film past said element and said window, an optical system for projecting light upon said window and also through said film upon the element, a diaphragm in the optical system having fixed and movable members whereby the intensity of light falling on the exposure window may be varied, the movable part of the diaphragm being controlled by said element whereby the light permitted to fall upon the window through the diaphragm will be caused to vary by variations in light falling on the element through the film.

Signed at Rochester, New York, this 25th day of March, 1927.

LOYD A. JONES.
CLIFTON M. TUTTLE.